(12) United States Patent
Pugaczewski et al.

(10) Patent No.: US 6,894,980 B1
(45) Date of Patent: May 17, 2005

(54) AUTOMATED METHOD AND SYSTEM FOR VERIFYING END-TO-END CONNECTIVITY IN A BROADBAND NETWORK

(75) Inventors: John T. Pugaczewski, White Bear Lake, MN (US); David W. Hoffman, Brooklyn Park, MN (US); Nicholas P. Chantiloupe, St. Louis Park, MN (US)

(73) Assignee: Qwest Communication International Inc., Denver, CO (US)

( * ) Notice: Subject to any disclaimer, the term of this patent is extended or adjusted under 35 U.S.C. 154(b) by 0 days.

(21) Appl. No.: 09/565,965

(22) Filed: May 5, 2000

(51) Int. Cl.[7] .............................................. H04L 12/26
(52) U.S. Cl. ...................... 370/242; 370/248; 370/249
(58) Field of Search ................................ 370/242, 248, 370/249, 241, 244, 250, 216, 252, 241.1, 236.2; 714/25, 39, 46, 716

(56) References Cited

U.S. PATENT DOCUMENTS

| | | | | |
|---|---|---|---|---|
| 5,864,555 A | * | 1/1999 | Mathur et al. | 370/236.2 |
| 5,936,943 A | * | 8/1999 | Sakagami et al. | 370/244 |
| 5,991,270 A | * | 11/1999 | Zwan et al. | 370/249 |
| 6,023,467 A | * | 2/2000 | Abdelhamid et al. | 370/236.2 |
| 6,198,726 B1 | * | 3/2001 | Hayami et al. | 370/236.2 |
| 6,314,102 B1 | * | 11/2001 | Czerwiec et al. | 370/395.6 |
| 6,477,238 B1 | * | 11/2002 | Schneider et al. | 379/22.04 |
| 6,496,477 B1 | * | 12/2002 | Perkins et al. | 370/228 |
| 6,532,215 B1 | * | 3/2003 | Muntz | 370/242 |
| 6,545,978 B1 | * | 4/2003 | Sakurai | 370/236.2 |
| 6,614,761 B1 | * | 9/2003 | So et al. | 370/249 |

OTHER PUBLICATIONS

Hamdi (US PUB 2001/0048667) discloses fast retrain based on communication profiles for a digital modem.*
Barzegar et al. (US PUB 2002/0027876) discloses circuit to provide backup telephone service for a multiple service access system using a twisted p.*
Starr (USPUB 2001/0043675) discloses telephone line testing.*

* cited by examiner

Primary Examiner—Ajit Patel
(74) Attorney, Agent, or Firm—Townsend and Townsend and Crew LLP

(57) ABSTRACT

An automated method as system for verifying end-to-end connectivity in a broadcast network such as an xDSL network including a plurality of elements such as ATM switches coupled to a subscriber modem. The method and system includes determining each of the elements in the network and establishing a communication channel with a corresponding interface of each element to generate test commands and elicit responsive data. Service logic is applied to determine the location of a fault and display the same on a Graphical User Interface (GUI) in a suitable format such as a Visual Word Document (VWD).

15 Claims, 5 Drawing Sheets

AUTOMATED METHOD AND SYSTEM FOR VERIFYING END-TO-END CONNECTIVITY IN A BROADBAND NETWORK

TECHNICAL FIELD

This invention relates to an automated method and system for verifying end-to-end connectivity in a broadband network.

BACKGROUND ART

Digital Subscriber Line signal architectures, generally denoted as xDSL, allow digital distribution of combined broadband video and data services with traditional narrowband voice transmissions.

One form of xDSL of particular interest to the present invention is VDSL (Very high speed Digital Subscriber Line), which is a packet-based transmission architecture used to provide extremely high bandwidth distribution of digital video and data signals to subscribers. A VDSL-based architecture can advantageously provide a single platform for supporting bandwidth-intensive applications, such as Internet access, remote LAN access, video conferencing, and video-on-demand.

ADSL or Asymmetric Digital Subscriber Line services generally use existing unshielded twisted pair (UTP) copper wires from a telephone company's central office to the subscriber's premise, utilize electronic equipment in the form of ADSL modems at both the central office and the subscriber's premise, send high-speed digital signals up and down those copper wires, and send more information one way than the other. The ADSL type of xDSL services is capable of providing a downstream bandwidth of approximately 1.5 Mbps–8 Mbps, and upstream bandwidth of about 16 Kbps–64 Kbps with loop distances ranging from about 3.7 km–5.5 km. HDSL or High bit rate Digital Subscriber Line services provide a symmetric, high performance connection over a shorter loop, and typically require two or three copper twisted pairs. HDSL is capable of providing both upstream and downstream bandwidth of approximately 1.5 Mbps, over loop distances of up to approximately 3.7 km. SDSL or single line digital services provide a symmetric connection that matches HDSL performance using a single twisted pair, but operating over a shorter loop of up to approximately 3.0 km.

VDSL services are typically implemented in an asymmetric form having a downstream transmission capability of approximately 52 Mbps over twisted pair copper wire arranged in local loops of 300 m, 26 Mbps at 1,000 m, and 13 Mbps at 1,500 m. Upstream data rates in asymmetric implementations tend to range from approximately 1.6 Mbps to approximately 2.3 Mbps. As though skill in the art will recognize, a typical distribution system includes a central office equipped with a Host Digital Terminal (HDT) and arranged to operate as a hub between multiple Video Information Providers (VIPs)/Digital Service Providers (DSPs) and customer residential dwellings. In a Fiber-To-The-Neighborhood (FTTN) type distribution system, optic fiber (e.g. OC-3 c and OC-12 c) lines are used to connect the central office to a Universal System Access Multiplexer (USAM), which is then connected to a Network Interface Device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer display device such as a television or personal computer. A Fiber-To-The-Curb (FTTC) type distribution system is similar except that a Broadband Network Unit (BNU) is used in place of the USAM, and coaxial cable is used to connect the BNU, NID, and set top box.

The VDSL signal format is used to carry signals to and from the customer. In these systems, the central office provisions each user for programming access rights, and maintains a profile database for each provisioned customer at the HDT to control the signals/channels that can be viewed by the customer.

As readily seen, broadband broadcast networks, and in particular, VDSL networks are complex communication systems. To insure proper operation, it is desirable to verify the VDSL signals and, as appropriate, isolate and resolve logical layer (layer 2-ATM) connectivity end-to-end. That is, from the customer side xDSL modem to a serving Internet Services Provider (ISP). Presently, however, no known system or method provides this functionality. Without this mechanism, trouble isolation and restoration is time-consuming and customer inconvenient as each component of the xDSL network must be individually identified and tested and the resultant data collected, analyzed, and compared to locate a logical layer fault. The test system uses current switching ATM layer and physical layer diagnostic capabilities. The method combines a rules system for providing an aggregated view of topology.

DISCLOSURE OF INVENTION

It is the principal object of the present invention to provide an automated method and system for verifying end-to-end connectivity and fault isolation and localization at the protocol layer where the fault occurred in a broadband network such as an xDSL network.

In carrying out the above object, there is provided an automated method which is adapted for use in a broadband network such as an xDSL network, including a plurality of switches such as Asynchronous Transfer Mode (ATM) switches coupled to a subscriber modem such as an xDSL modem. The automated method for verifying end-to-end connectivity comprises determining or identifying each of the components in the network and for each determined component, establishing a communication channel with an interface to generate corresponding test commands and elicit responsive data. In the preferred embodiment, the network components are ATM switches and the communication channel is established via an Internet "Telnet" session and SNMP. Service logic is thereafter applied to determine the location of a fault.

In carrying out the above method, there is provided a system which automates the above steps. The system comprises a computer "processor" having the functionality to identify or determine each of a plurality of network components such as ATM switches in a broadband network and for each determined switch establish a communication channel with an interface to generate corresponding test commands and elicit responsive data. The computer additionally has functionality to apply service logic to determine the location of a fault.

These and other objects, features, and advantages of the present invention will become more readily apparent by reference to the following description of the drawings wherein like reference numerals correspond to like components.

BEST MODE FOR CARRYING OUT THE INVENTION

Figure 1:
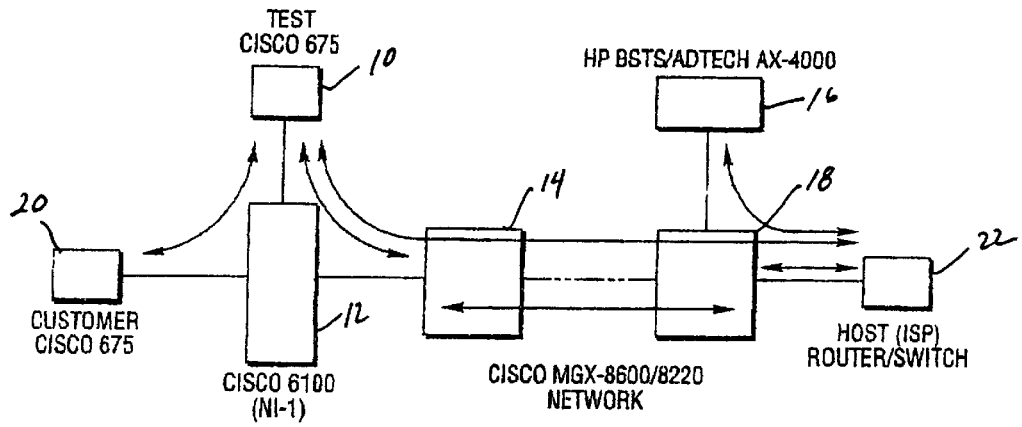
FIG. 1 is a schematic diagram of an xDSL network including the possible Operations, Administration, and Maintenance (OAM) loopback cell paths available for service.

With reference to FIG. 1 of the drawings, there is shown a generalized schematic of the many elements 10–16 in an xDSL network and, more particularly, between a subscriber 20 also known as a Megabit subscriber and an Internet Services Provider (ISP) 22. In FIG. 1, the representative elements are depicted as Asynchronous Transfer Mode (ATM) switches including Test Cisco 675 10, Cisco 6100 12, Cisco MGX-8600/8220 14/18 and HP BSTS/Adtech AX-4000 16. As indicated above, current operations centers use testing devices which are only capable of generating a "segment" OAM loopback cell using a Command Line Interface (CLI). For example, many operations centers use a view runner and a WAN manager as the Element Management System (EMS) for the Cisco 6100 and Cisco BPX/ AXIS platforms. The Cisco 6100 12 currently does not, however, have the ability to generate or respond to ATM OAM loopback cells. Therefore, the only mechanism for "end-to-end connectivity" testing is from the ISP (or business) router 22 to the customer premise router. The invention described herein automates the generation of "segments" to provide end-to-end connectivity.

In the preferred embodiment, the method and system incorporates a test device such as Cisco 675 10 deployed at each DSLAM (Cisco 6100) 12 or subtended set of Cisco 6100s. In addition, the method and system is adapted to interface to a server such as an NT 4.0 server or other suitable server with terminal server capabilities running Citrix metaframe. The system is adapted to communicate with the operations center for customer identification and for configuration of other related functions.

In keeping with the invention, the method is adapted to first determine each of the elements or components in the network. The invention accomplishes this by providing a user with a graphical presentation of the subscriber path end-to-end along with the attributes of each element (node and segment) in the path. In the preferred embodiment, the graphical representation is provided in the form of a Visual Word Document (VWD). Once each of the elements, typically ATM switches, have been determined, a series of fault localization tests are performed such as, for example, Test Customer, Test Network, Test Host, and Autolocalize. Prior to performing these tests, however, a communication channel is established with an interface of each element. In the preferred embodiment, the communication channel is an Internet Telnet session, the details of which are well known to those skilled in the art. The method and system of the present invention, which is typically, but not necessarily, hosted on a remote computer or processor, elicits response data from each of the network elements and thereafter applies service logic to determine the location of one or more faults. The design of the interface is independent of the Graphical User Interface (GUI) or any other access method. In other words, the tool can be accesses via a GUI or embedded in another application programmably.

Figure 3:
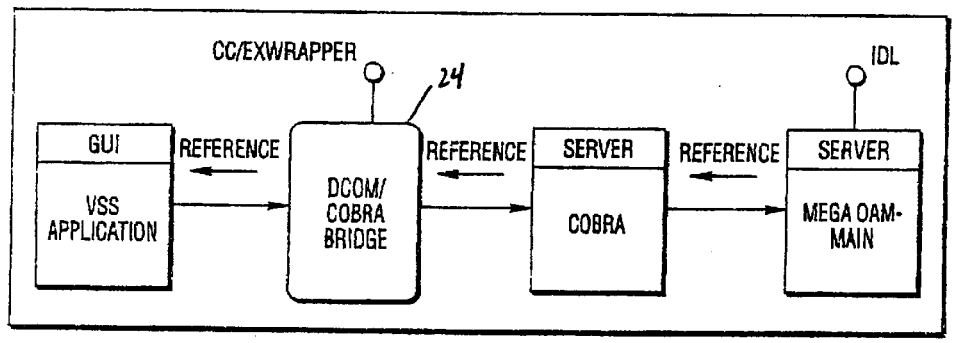
FIG. 3 is a schematic diagram of the interface of the present invention.
Figure 2:
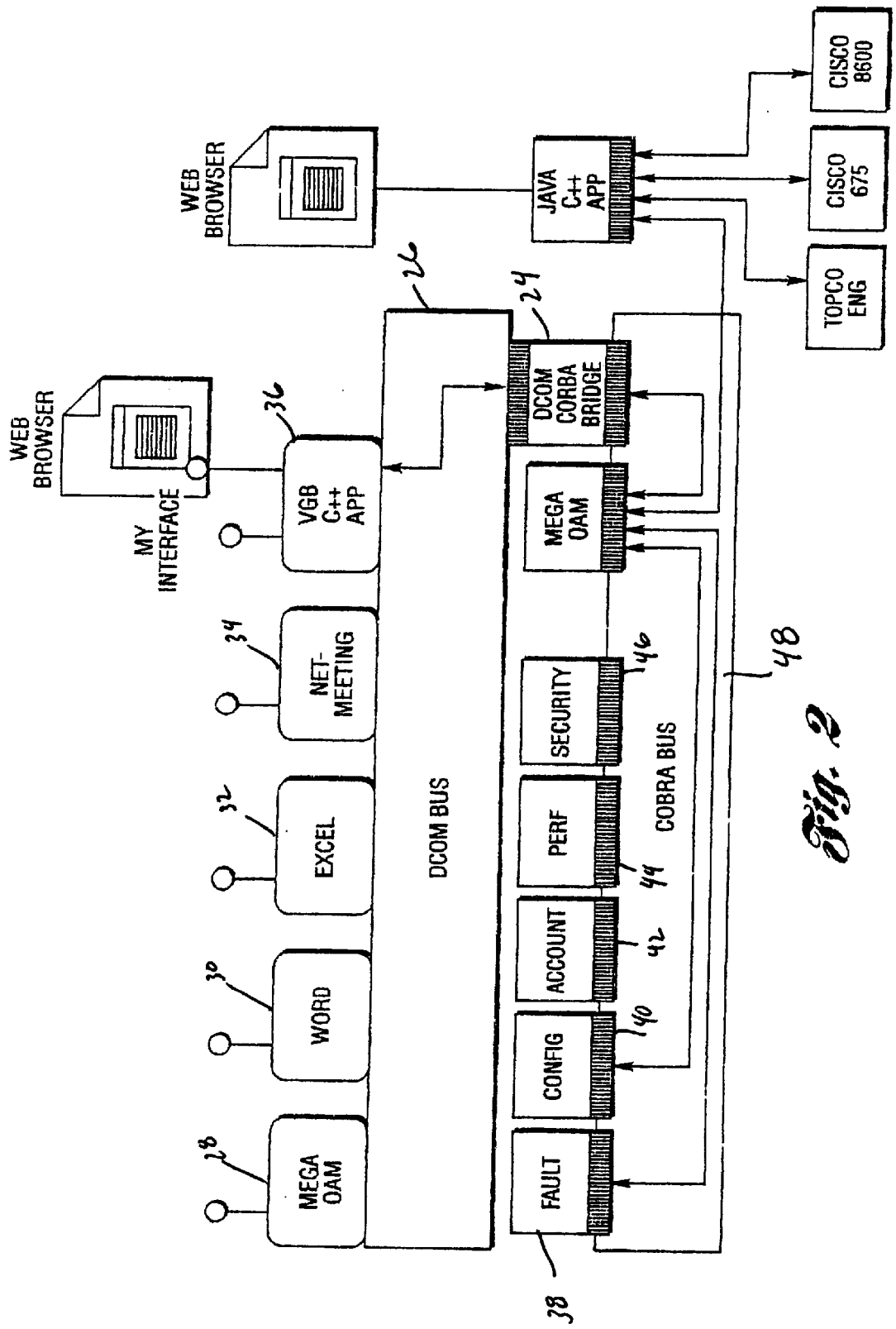
FIG. 2 is a schematic diagram of the component architecture of the present invention.

In a preferred embodiment, the software of the present invention is developed using a combination of systems that employ CORBA, DCOM, JAVA, SQL and/or any other suitable interfaces and programming implementations. FIGS. 2–3 of the drawings illustrate the architecture of the invention. More specifically, FIG. 2 describes the component architecture upon which the invention was developed. As discussed further below, the intent is to make communication with each element object independent of the implementation language. That is, the architecture is based on a distributed object oriented model that is access independent. Access to the functions provided by the invention is provided by a CORBA interface. This CORBA interface is used to access configuration capabilities provided by a Syndesis-Netactivator-product. As shown, a DCOM/CORBA bridge 24 provided by Ionia is used to enable objects on a DCOM bus 26. Bridge 24 thus provides access for clients that reside on bus 26 such as Mega OAM 28, Word 30, Excell 32, Net Meeting 34 and VGB 36. The purpose of this is to provide applications to be built using VB6, Visual J++, Visual C++ or any other suitable language. Applicants anticipate that in the future, the method and system of the present invention could interface to Fault 38, Configure 40, Account 42, Performance 44, and Security 46 models using CORBA. The CORBA interface may also be used by FCAPS functions or clients outside of the CORBA bus 48.

Activator may be provided for provisioning purposes. Specifically, for several tests the customer PVC must be temporarily taken out and replaced with a test PVC that connects the customer's Cisco 675 with a test Cisco 675 located off of the serving Cisco 6100 DSLAM. That is, the method and system establishes a virtual channel connection between the subscriber modem a DSLAM located at a Serving Central Office switch, an ATM switch, and back to the DSLAM. This virtual channel allows for testing to be performed in a segment which the prior art did not provide for.

Again, in the preferred embodiment, Integrator acts as the topology engine and is accessed using JDBC. A controller coordinates the PVC verification information between the integrator and the activator. The activator stores PVC information and physical connectivity for the Cisco subnetwork domain. Integrator stores this information along with the facility and node connectivity for the entire path. The verification of the path is, therefore, currently for the Cisco (ATM) subnetwork.

Integrator provides customer, DSLAM, Cisco subnetwork, and host information that can be accessed by the client and displayed in a client-specific manner. The Cisco 8600 is accessed using two methods that depend upon the operation. As indicated above, a Telnet proxy object is used when performing ATM OAM segment loopback testing. Outback SNNP may be used to communicate with the Cisco WAN manager service agent for intra-domain ATM segment loopback testing. The Cisco 675 may be used as a test device at the customer serving Cisco 6100. The Cisco 675 performs the ATM end-to-end loopback test from a Telnet proxy object.

It is an object of the present invention to provide a graphical representation such as a Visual Word document and the ability to fault localize a Megabit subscriber path end-to-end. This functionality is interface independent. That is, functionality is performed from any type of device (i.e. PDA, PC, telephone, etc.). The DCOM bus 26 provides the mechanism for the tool to be accessed from applications that are interprocess connected to e-mail, voice mail, IVR, and PDAs.

As indicated above, the method and system provides the user with a graphical representation of the subscriber path end-to-end through a Visual Word document. FIG. 3 illustrates a well defined interface. As shown, a client object will obtain a reference to a server in order to request the services of that object. In the preferred embodiment, the Graphical User Interface will generate its own copy of this information for each Megabit subscriber. The information is stored as a set of visual basic objects, each with a set of attributes. For example, a pat element has an attribute of a file name. This file contains a GIF file of the type of object. A segment will have a state attribute of up, down, or unknown. The variables and arrays will be used to represent the other information.

Figure 4:
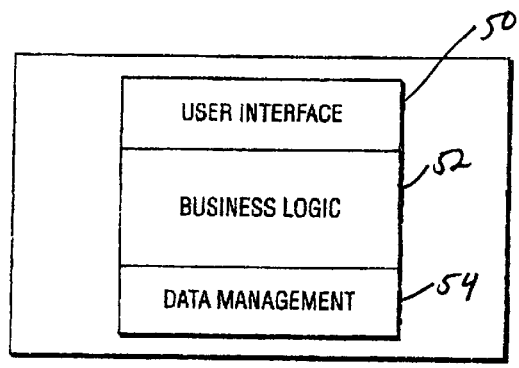
FIG. 4 is a schematic diagram of the three tier architecture of the present invention.

Turning now to FIG. 4, the method and system comprises a three tier design consisting of a user interface layer 50, a business logic layer 52, and a data management layer 54. One of the goals of this architecture is to abstract away the user interface from the business logic layer 52. In this manner, the business logic is user interface agnostic. The end user application can be implemented in any manner as long as it supports the interface to the business logic layer 52. Currently, Applicants anticipate that the business logic layer 52 will support a CORBA and a DCOM interface. For this reason, the user interface application may be physically located anywhere as long as it has a communication link to the business logic server.

In keeping with the invention, the business logic layer 52 implements all the back office server operations. This layer contains the main controller object of the software projects along with the internal rules and logic to perform complicated tasks and operations. As with almost every software project, there is a need to store, change, and retrieve data. This takes place at the data management layer 54. The Graphical User Interface, as discussed above, is preferably, but not necessarily, implemented in Visual Basic 6. This user interface application needs to communicate with the business logic layer server in order to request services. To this end, the application communicates with a DCOM/CORBA bridge 24 to communicate to the server as shown in FIG. 3. At the end of the initial exchange, the client application is a reference to the server and can make service requests.

Figure 5:
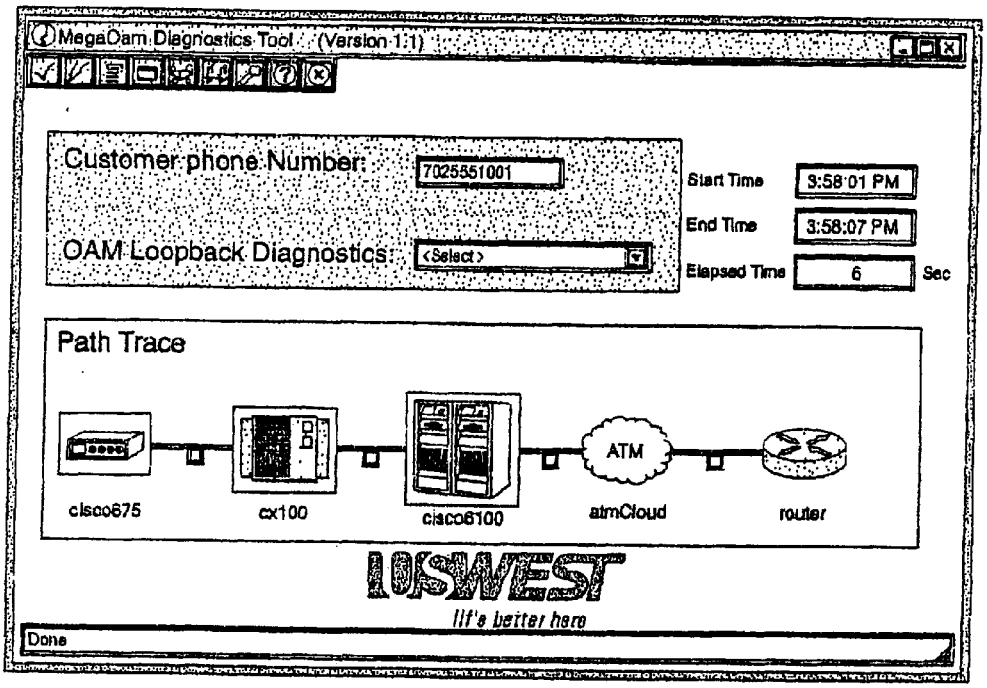
FIG. 5 is a schematic diagram of a user interface illustrating the elements and segments that comprise a customer's service shown as a Visual Word Document.
Figure 6:
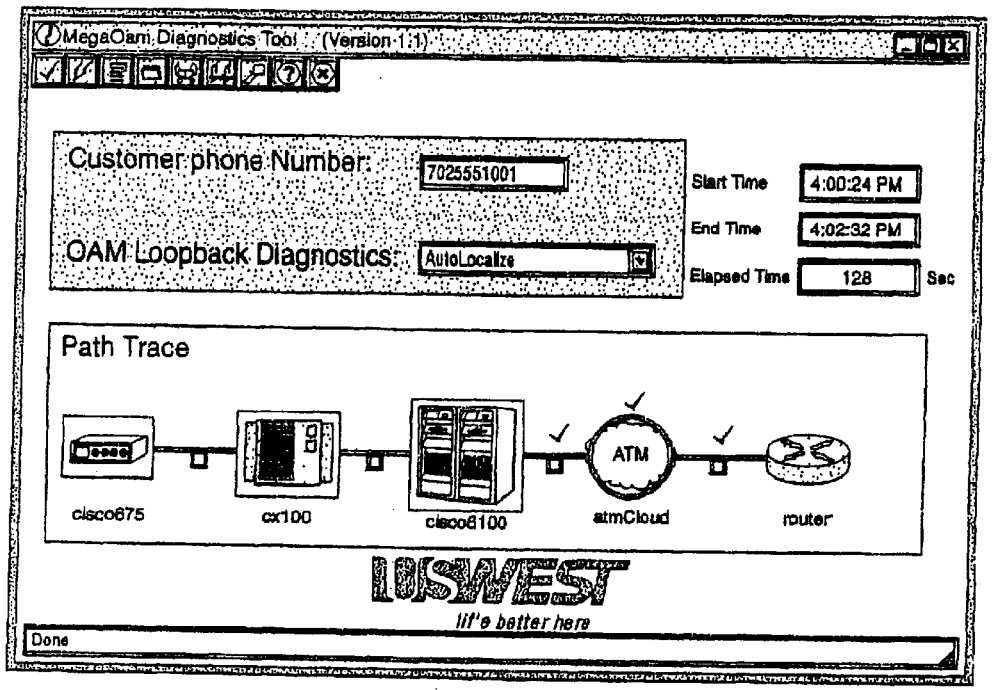
FIG. 6 is a schematic diagram of a user interface illustrating the location of a possible fault condition following completion of an OAM loopback diagnostic test.
Figure 7:
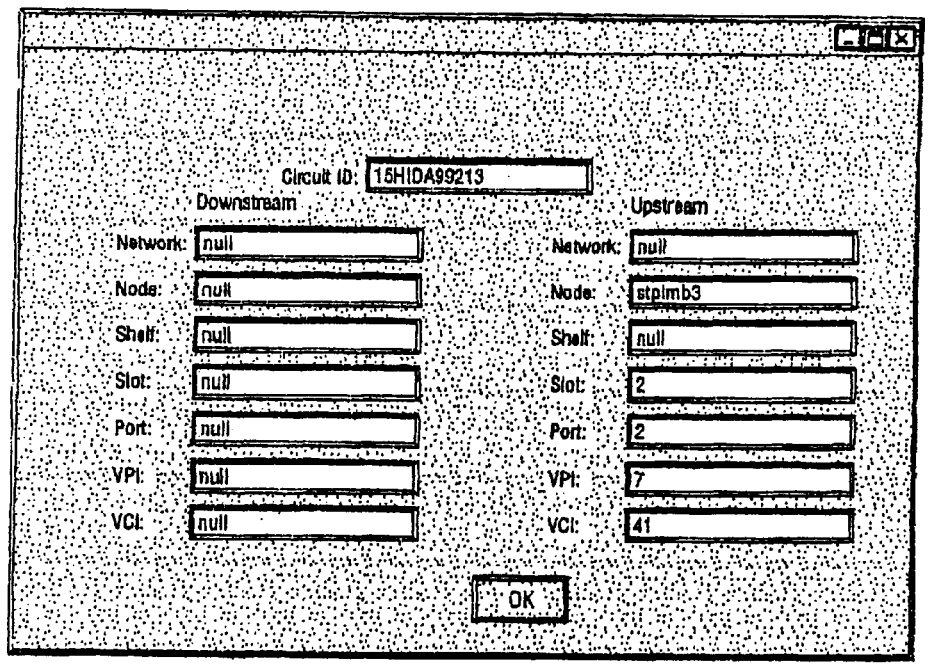
FIG. 7 is a schematic diagram illustrating the various attributes associated with each element and segment of the Visual Word Document of FIG. 5.
Figure 8:
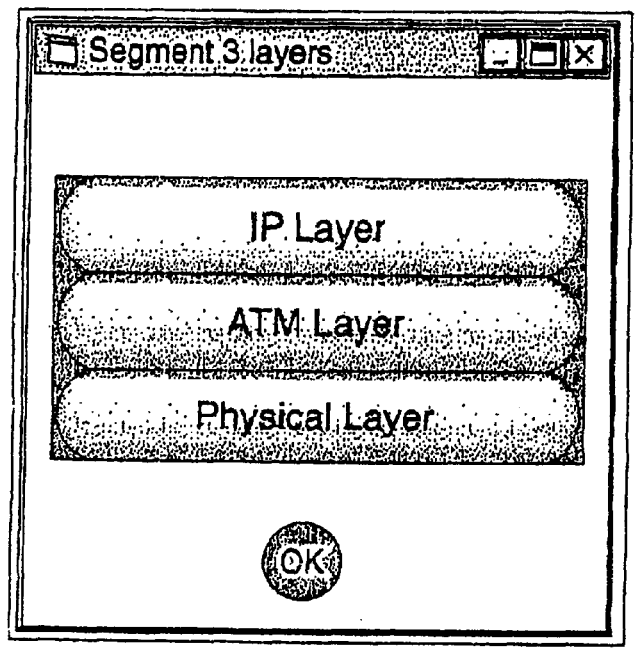
FIG. 8 is a schematic diagram of a user interface illustrating the protocol layer frame of an affected segment depicting a fault condition and the layer at which the fault occurred.

The user interface 50 will consist of forms written in VB6 or any other suitable language. The VB6 forms will contain all the necessary components for the user to access all the functionality of the server application. The forms will be displayed on the user's screen as a regular WIN32 application. All responses to the user are defined in the CORBA IDL of the tool. Once the client application has received the response, it is up to the client application to format the information for display. FIGS. 5–8 are drawings of representative screen shots of the user interface forms. FIG. 5 is a schematic diagram of a Visual Word Document (VWD) and provides an end-to-end visual representation of the elements and segments that comprise the customer's service. In addition, all the attributes associated with each element and segment are available from the VWD. FIG. 6 is a schematic diagram of the fault localization. In keeping with the invention, upon completion of an OAM loopack diagnostics test, the interface depicts the location of any fault conditions. FIG. 7 describes all of the attributes associated with each element and segment of the VWD shown in FIG. 5. FIG. 8 illustrates fault isolation. More specifically, upon completion of an OAM loopback diagnostics test, the protocol layer frame of the affected segment depicts the fault condition and the layer i.e. IP, ATM, or Physical, at which the fault occurred.

Figure 9:
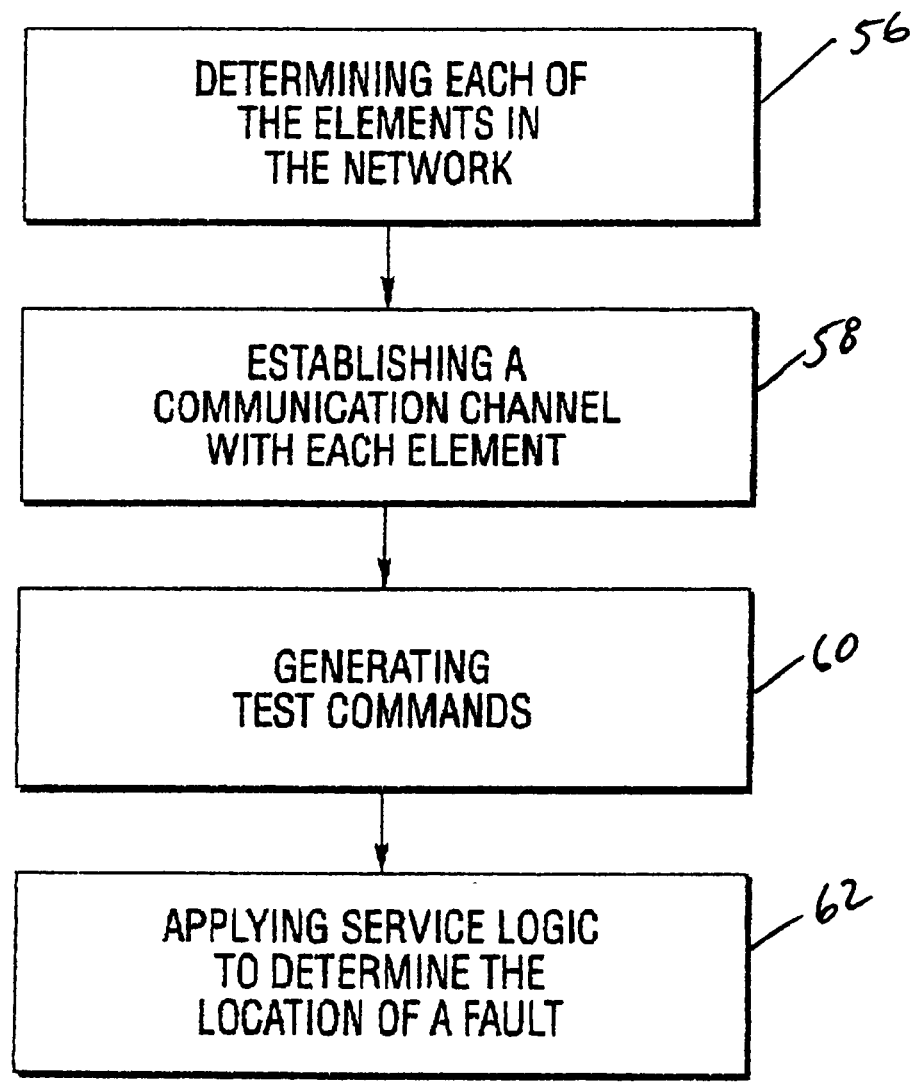
FIG. 9 is a flow diagram illustrating the process flow of the method step of the present invention.

With reference now to FIG. 9 of the drawings the method steps of the present invention are described in further detail. As indicated above, the automated method is adapted for use in a broadcast network such as a broadband network and, preferable an xDSL network such as a DSL network which includes a plurality of elements and segments such as ATM switches coupled to a subscriber modem. The automated method for verifying end-to-end connectivity comprises determining 56 each of the elements in the network. The method further comprises for each determined element, establishing 58 a communication channel such as a Telnet session with an interface and generating 60 corresponding test commands to elicit responsive data. Finally, the method comprises applying 62 service logic to determine the location of a fault.

As readily seen, by automating the above fault tolerant localization process, substantial time, labor and resources may be conserved.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a broadcast network including a plurality of elements coupled to a subscriber modem, an automated method for verifying end-to-end connectivity, comprising:
   determining each of the elements in the network;
   for each determined element, establishing a communication channel with an interface and generating corresponding test commands to elicit responsive data; and
   applying service logic to determine the location of a fault.

2. A method as in claim 1, further comprising establishing a virtual circuit between the subscriber modem and a test device located at a serving central office and applying service logic to determine if the connection has a fault.

3. A method as in claim 1, wherein the broadcast network is an xDSL network.

4. A method as in claim 1, wherein the communication channel is an Internet Telnet session.

5. A method as in claim 1, wherein the elements are switches.

6. A method as in claim 5, wherein the switches are Asynchronous Transfer Mode (ATM) switches.

7. A method as in claim 1, wherein the location of the fault is determined to a protocol layer.

8. A method as in claim 1, wherein applying service logic includes testing a physical layer.

9. In an xDSL network including a plurality of Asynchronous Transfer Mode (ATM) switches coupled to a subscriber modem, an automated method for verifying end-to-end connectivity to the protocol layer, comprising:

determining each of the switches in the network;

for each determined switch, establishing a communication channel with an interface and generating corresponding test commands to elicit responsive data including responsive data from the physical layer;

applying service logic to determine the location of a fault; and providing the location of a fault to a user via Graphical User Interface (GUI).

10. A method as in claim 9, wherein the location of a fault is provided as a Visual Word Document.

11. For use in a broadcast network including a plurality of elements coupled to a subscriber modem, a system for automatically verifying end-to-end connectivity, comprising:

means for determining each of the elements in the network;

means for establishing a communication channel with an interface of each determined element and generating corresponding test commands to elicit responsive data; and means for applying service logic to determine the location of a fault.

12. A system as in claim 11, further comprising means for establishing a virtual circuit between the subscriber modem and a test device located at a serving central office and applying service logic to determine if the connection has a fault.

13. A system as in claim 11, wherein the broadcast network is an xDSL network.

14. A system as in claim 11, wherein the communication channel is an Internet Telnet session.

15. In an xDSL network including a plurality of Asynchronous Transfer Mode (ATM) switches coupled to a subscriber modem, a test device for verifying end-to-end connectivity, comprising:

means for determining each of the switches in the network;

means for establishing a communication channel with an interface of each switch and generating corresponding test commands to elicit responsive data; and means for applying service logic to determine the location of a fault.

* * * * *